(12) United States Patent
Kachare et al.

(10) Patent No.: US 11,544,212 B2
(45) Date of Patent: *Jan. 3, 2023

(54) DIFFERENTIATED STORAGE SERVICES IN ETHERNET SSD

(71) Applicant: Samsung Electronics Co., Ltd., Suwon-si (KR)

(72) Inventors: Ramdas P. Kachare, Cupertino, CA (US); Dong Gi Lee, Yongin (KR); Ajay Sundar Raj, San Jose, CA (US); Fred Worley, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/134,094

(22) Filed: Dec. 24, 2020

(65) Prior Publication Data

US 2021/0117369 A1    Apr. 22, 2021

Related U.S. Application Data

(63) Continuation of application No. 15/878,388, filed on Jan. 23, 2018, now Pat. No. 10,884,975.

(60) Provisional application No. 62/593,189, filed on Nov. 30, 2017.

(51) Int. Cl.
*G06F 15/173* (2006.01)
*G06F 3/06* (2006.01)
*H04L 45/50* (2022.01)

(52) U.S. Cl.
CPC ........ *G06F 15/17331* (2013.01); *G06F 3/067* (2013.01); *G06F 3/0611* (2013.01); *G06F 3/0659* (2013.01); *H04L 45/50* (2013.01)

(58) Field of Classification Search
CPC .... G06F 15/17331; G06F 3/061; G06F 3/067; H04L 45/50
See application file for complete search history.

(56) References Cited

U.S. PATENT DOCUMENTS

| | | |
|---|---|---|
| 6,205,488 B1 | 3/2001 | Casey et al. |
| 7,328,223 B2 | 2/2008 | Nakamichi et al. |
| 7,469,325 B2 | 12/2008 | Shibayama et al. |
| 7,535,917 B1 | 5/2009 | Son |
| 7,599,360 B2 | 10/2009 | Edsall et al. |
| 9,059,912 B2 | 6/2015 | Xu et al. |
| 9,210,075 B2 | 12/2015 | Bhattacharya |

(Continued)

FOREIGN PATENT DOCUMENTS

| | | |
|---|---|---|
| CN | 105556930 A | 5/2016 |
| CN | 106688217 A | 5/2017 |

(Continued)

*Primary Examiner* — Joe Chacko
(74) *Attorney, Agent, or Firm* — Lewis Roca Rothgerber Christie LLP

(57) ABSTRACT

A system and method for differentiated storage services with a Ethernet SSD includes receiving, at an Ethernet SSD (eSSD), an input/output (I/O) service request from a remote host via a multiprotocol label switching (MPLS) network. The I/O service request includes at least one parameter that may be used to match the I/O service request to a label switched path (LSP) based on the parameter(s). A storage traffic stream may then be opened between the eSSD and the remote host over the MPLS network according to the LSP.

20 Claims, 5 Drawing Sheets

(56) References Cited

U.S. PATENT DOCUMENTS

| | | | |
|---|---|---|---|
| 9,419,892 B2 | 8/2016 | Kompella | |
| 9,450,864 B2 | 9/2016 | Zhao et al. | |
| 9,467,511 B2 * | 10/2016 | Tamir | G06F 3/0659 |
| 9,588,901 B2 | 3/2017 | Chahal et al. | |
| 9,608,908 B2 | 3/2017 | Yoshida et al. | |
| 9,792,056 B1 * | 10/2017 | Gao | G06F 3/0689 |
| 10,114,778 B2 | 10/2018 | Worley et al. | |
| 10,140,063 B2 | 11/2018 | Worley et al. | |
| 10,503,679 B2 | 12/2019 | Huang | |
| 2005/0198224 A1 | 9/2005 | Kobayashi et al. | |
| 2005/0210137 A1 | 9/2005 | Taguchi | |
| 2009/0182874 A1 * | 7/2009 | Morford | H04L 43/08 709/224 |
| 2010/0131469 A1 | 5/2010 | Umemura | |
| 2013/0290361 A1 | 10/2013 | Anderson et al. | |
| 2015/0254088 A1 | 9/2015 | Chou et al. | |
| 2015/0271102 A1 | 9/2015 | Antich | |
| 2016/0127492 A1 * | 5/2016 | Malwankar | G06F 3/0614 709/212 |
| 2016/0337175 A1 * | 11/2016 | Rao | H04L 67/1097 |
| 2017/0310581 A1 | 10/2017 | Endo et al. | |

FOREIGN PATENT DOCUMENTS

| | | |
|---|---|---|
| JP | 2005-252450 A | 9/2005 |
| JP | 2005-266933 A | 9/2005 |
| JP | 2007-286709 A | 11/2007 |
| JP | 2010-123084 A | 6/2010 |
| KR | 10-2016-0106501 A | 9/2016 |
| KR | 10-2016-0131906 A | 11/2016 |
| WO | 2016/194089 A1 | 12/2016 |

* cited by examiner

DIFFERENTIATED STORAGE SERVICES IN ETHERNET SSD

CROSS-REFERENCE TO RELATED APPLICATION(S)

The present application is a continuation of U.S. patent application Ser. No. 15/878,388, filed Jan. 23, 2018, which claims priority to, and the benefit of, U.S. Provisional Patent Application No. 62/593,189, filed on Nov. 30, 2017, the entire contents of all of which are incorporated herein by reference.

BACKGROUND

1. Field

Some embodiments of the present disclosure relate generally to an Ethernet solid state drive (eSSD).

2. Description of the Related Art

Non-volatile memory express over fabrics (NVMe-oF) allows for a host computer to perform Input/Output (I/O) operations directly with a SSD via a network. Using NVMe-oF SSDs allow for remote direct attached storage that is disaggregated with minimal latency addition. Common methodologies of communicating with the SSDs include remote direct memory access (RDMA), RDMA over Converged Ethernet (RoCE), Internet Wide-area RDMA (iWARP), and NVMe-over-TCP.

Existing storage traffic methodologies lack a means for differentiating storage traffic versus non-storage traffic. The inability to differentiate storage traffic from non-storage traffic makes it difficult to implement a guaranteed quality of service (QoS) for I/O. Furthermore, switches and routers have limited buffering and network congestion can further slow I/O in unpredictable ways. An improved networking system is therefore desired.

The above information is only for enhancement of understanding of the background of embodiments of the present disclosure, and therefore may contain information that does not form the prior art.

SUMMARY

Some embodiments of the present disclosure provide a system and method for providing differentiated storage services in an Ethernet SSD (eSSD) system. In various embodiments, an eSSD system is configured to receive input/output (I/O) service requests from a remote host via a multiprotocol label switching (MPLS) network. In various embodiments, the service request may include at least one parameter. In various embodiments, the I/O service request is matched to a label switched path (LSP) based on the at least one parameter and a storage traffic stream that connects the remote host to the eSSD according to the LSP through the MPLS network is opened.

In various embodiments, the matching, of the I/O service request to the LSP is done using the at least one parameter and a label-lookup table (LLT).

In various embodiments, the LLT is stored on the eSSD.

In various embodiments, the storage traffic stream comprises at least one MPLS packet.

In various embodiments, the system is further configured to encapsulate, by the eSSD, a first data packet into a MPLS packet. In various embodiments, the MPLS packet includes a MPLS header having a label stack associated with the LSP.

In various embodiments, the first data packet is one of a remote direct memory access packet, a RDMA over Converged Ethernet packet, an Internet Wide-area RDMA packet, or an NVMe-over-TCP packet.

In various embodiments, the at least one parameter is at least one storage parameter.

In various embodiments, the at least one storage parameter is at least one of a Queue Pair ID (QPID), a Submission Queue ID (SQID), a Completion Queue ID (CQID), a NVMe Controller ID (CNTID), a Namespace ID (NSID), a LBA Range <Start LBA> to <End LBA>, a NVMe Stream ID, a Host Identifier, a NVMe Subsystem (NQN) Identifier, a Time-based ID, a Date-based ID, and a NVM Set ID.

In various embodiments, the at least one parameter includes at least one network parameter.

BRIEF DESCRIPTION OF THE DRAWINGS

Some embodiments can be understood in more detail from the following description taken in conjunction with the accompanying drawings, in which.

DETAILED DESCRIPTION

Figure 1:
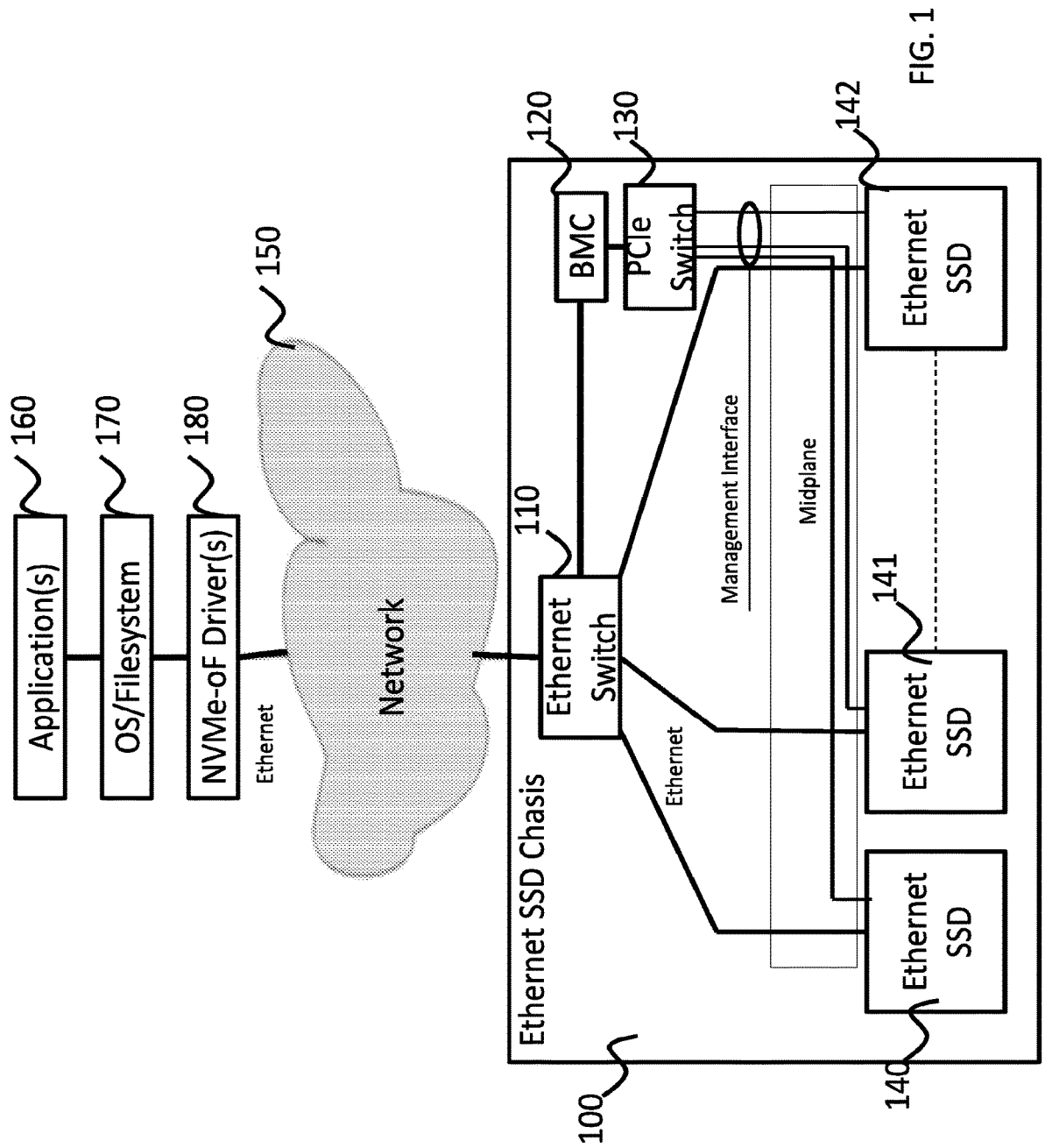
FIG. 1 depicts an example MPLS capable NVMe-oF Ethernet SSD system.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for differentiated storage services in NVMe-oF Ethernet SSDs using Multiprotocol Label Switching (MPLS). MPLS allows for the use of labels identifying paths between nodes instead of traditional long network addresses coupled with routing tables. In various embodiments, an MPLS capable eSSD may be configured with ability to function as a MPLS label edge router (LER). Thus, the eSSD is capable of encapsulating traditional eSSD I/O packets into MPLS packets that include a label stack for egress traffic as well as remove MPLS packets from ingress traffic. Storage and network parameters may be utilized for traffic classification to/from the eSSD and used to determine the MPLS labels for routing. The MPLS labels may therefore be selected according to a quality of service associated with the storage and network parameters.

FIG. 1 depicts an example MPLS capable NVMe-oF Ethernet SSD system.

Referring, to FIG. 1, in various embodiments, an Ethernet SSD chassis 100 may include an Ethernet switch 110, a BMC 120, a PCIe switch 130, and multiple eSSDs 140, 141, 142. The eSSDs 140-142 are connected to the network 150 via the Ethernet switch 110. The eSSDs 140-142 are also connected to the BMC 120 via the PCIe switch 130. In various embodiments the BMC 120 may be configured for performing management tasks for the eSSDs 140-142. For example, the BMC 120 may be configured for maintaining MPLS label mappings in a Label Look-up table (LLT) for each eSSD 140-142. Applications 160 operating on a remote host may utilize the eSSDs 140-142 for I/O via the OS/file-system 170 and NVMe-oF Driver 180.

For example, in various embodiments, the application 160 may have a quality of service (QoS) requirement and the network 150 includes a MPLS network. Based on the QoS requirement, the NVMe-oF driver 180 generates MPLS packets that encapsulate the I/O commands and include a label/label stack for routing the I/O in accordance with the QoS requirement of the application 160. The MPLS I/O command is received at an eSSD 140-142 which may operate as a MPLS Label Edge Router (LER) and removes the I/O command from the MPLS packet and performs the designated I/O function. An eSSD may use MPLS packets to perform any data transfers to/from host that are needed as part of the command execution. Return command completion is encapsulated by the eSSD 140-142 into a MPLS packet having labels describing the return I/O path that was selected in accordance with the QoS requirement.

Figure 2:
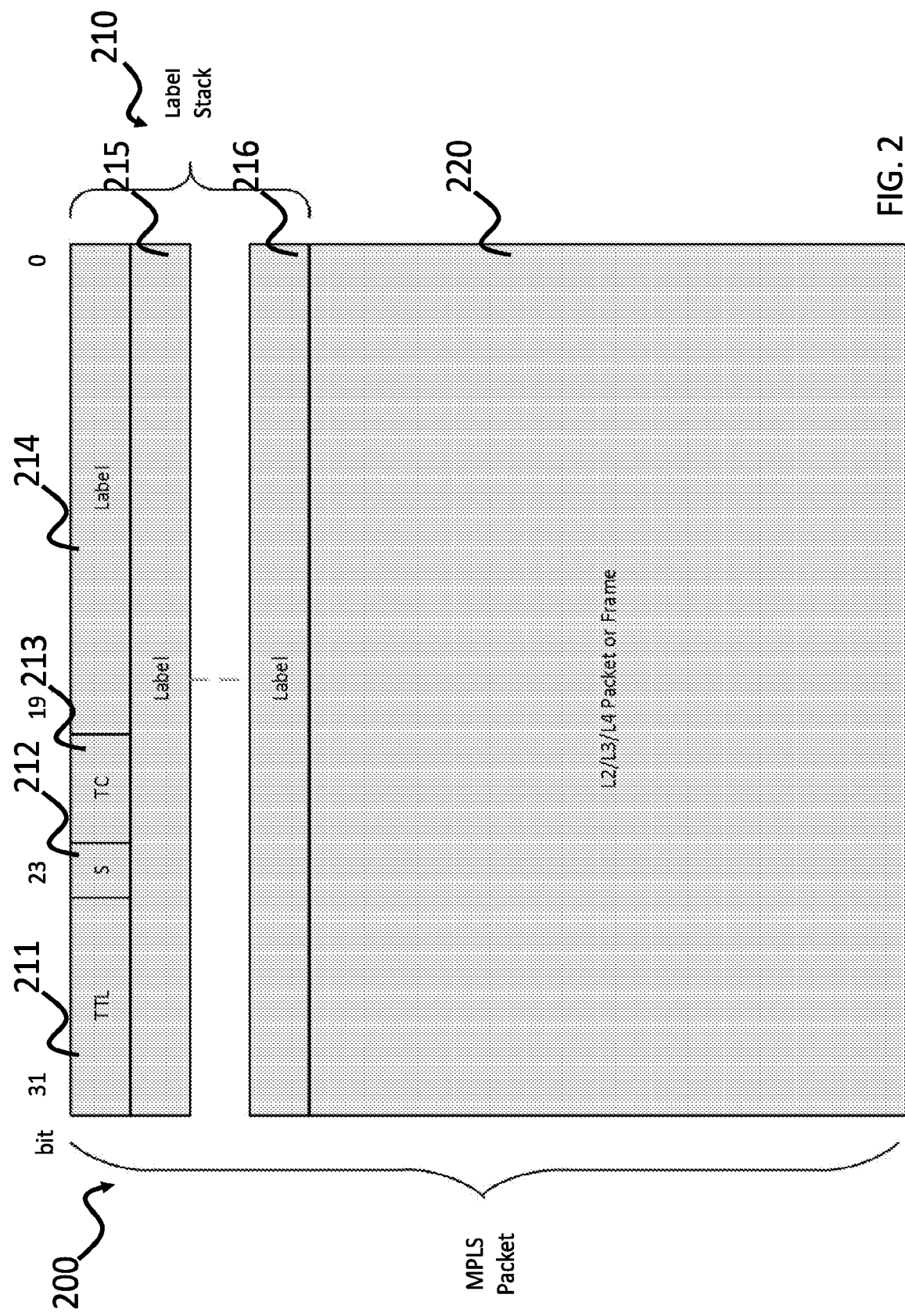
FIG. 2 depicts an example MPLS packet in accordance with various embodiments.
Figure 3:
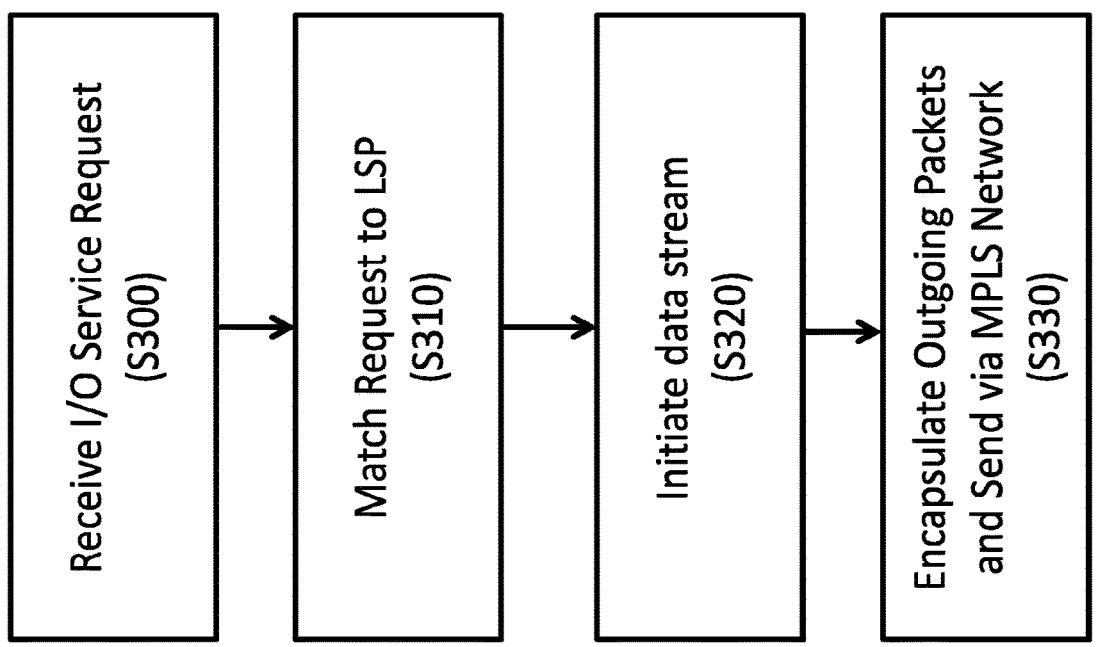
FIG. 3 depicts an example method of differentiating storage services using MPLS in accordance with various embodiments.

FIG. 2 depicts an example MPLS packet in accordance with various embodiments. FIG. 3 depicts an example method of differentiating storage services using MPLS in accordance with various embodiments.

Referring to FIG. 2, in various embodiments, an eSSD 140-142 is configured to function as a LER for the MPLS network. As a LER, the eSSD 140-142 is configured to encapsulate the data packets into MPLS packets 200 by adding a MPLS header that includes label stack 210 that includes a label switched path (LSP) for the I/O stream and other MPLS data fields to a conventional data packet which includes the appropriate header information for traversing a non-MPLS network (e.g. a conventional network) and any data payload. In various embodiments, an eSSD 140-142 may receive an I/O service request from a remote host via a MPLS network (S300). In various embodiments, the I/O service request may include storage and other parameters for differentiating the requested I/O service request from other requests. For example, different storage traffic streams may be differentiated (e.g. treated differently) by the network based on network conditions and a QoS requirement for the I/O. For example, a shorter (e.g. faster path) may be used for I/O with a high speed QoS requirement, while a longer (e.g. slower path) may be used for I/O with a low-speed QoS requirement. Upon receiving the I/O service request, the eSSD 140-142 may remove the MPLS label stack and, based on the provided parameters, match the I/O service request to a LSP (S310). In various embodiments, matching the I/O service request may include matching the request using a Label-Lookup Table (LLT). For example, various storage parameters may be used to map a storage traffic stream to a LSP. The storage parameters may include a Queue Pair ID (QPID), Submission Queue ID (SQID), Completion Queue ID (CQID), NVMe Controller ID (CNTID), Namespace ID (NSID), LBA Range <Start LBA> to <End LBA>, NVMe Stream ID, Host Identifier, NVMe Subsystem (NQN) Identifier, Time-based, Date-based, NVM Set ID, or any other storage parameter. Additionally, in some embodiments, non-storage parameters such as a network header field may be used for mapping a storage traffic stream to a LSP. A storage administrator may program how one or more of the storage parameters maps to each LSP. For example, the storage administrator may program the LLT using the BMC 120. The BMC may then distribute the LLT via the PCIe Switch 130 and the PCIe bus to each of the connected eSSDs 140-142. Each eSSD 140-142 may then utilize the LLT to assign a LSP for the I/O request. In various embodiments, each eSSD 140-142 may be assigned the same LLT, while in other embodiments, unique LLTs may be assigned to one or more eSSDs 140-142. Once the I/O service request has been matched to a LSP, a storage traffic stream may be initiated (S320). Outgoing packets are encapsulated by the eSSD 140-142 into MPLS packets that include a label stack that defines the selected LSP (S330).

In various embodiments, a conventional data packet 220 which carries a data payload and also includes any required information for routing the packet in a conventional network is encapsulated in the MPLS packet 200 as a payload. For example, in various embodiments, the conventional packet may include a RDMA, a RoCE, a RoCE v2, an iWARP, or an NVMe-over-TCP packet. The conventional data packet 220 is encapsulated by adding a MPLS header.

In various embodiments, MPLS header includes the label stack 210, a time to live (TTL) field 211, a bottom of stack (S) field 212 a traffic class (TC) field 213, and one or more labels 214, 215, 216. In various embodiments, the TC field 213 may be used for QoS purposes. As discussed above, each label 214-216 is used to identify a leg in a path between nodes in the MPLS network 150 to make up the LSP. The labels may be provided by the LLT as described above.

Figure 4:
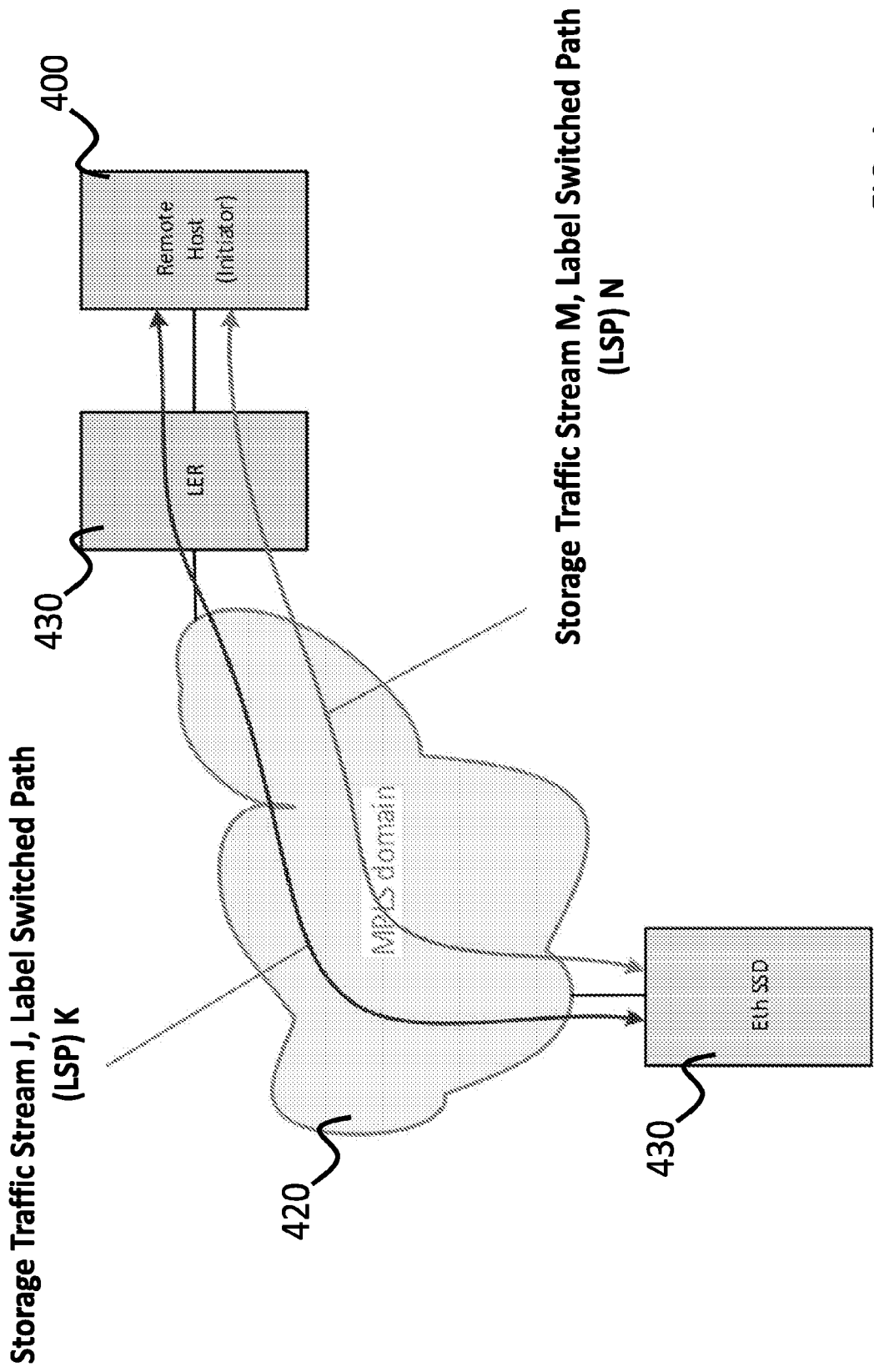
FIG. 4 depicts an example eSSD MPLS network where the initiating host is part of the MPLS network domain according to various embodiments.

FIG. 4 depicts an example eSSD MPLS network where the initiating host is part of the MPLS network domain according to various embodiments.

Referring to FIG. 4, in various embodiments a remote host 400 is part of an MPLS network 420. In these embodiments, the remote host is configured to connect to a LER 410 that encapsulates I/O from the host for outgoing traffic and removes the MPLS packet info for incoming I/O. The MPLS network 420 includes multiple nodes for routing data that can be used to form a plurality of label switched paths (LSPs). An eSSD 430 configured for MPLS communications is also connected to the MPLS network 420 and can receive I/O requests from the remote host 400. In various embodiments, the remote host 400 may include multiple storage traffic streams. For example, FIG. 4 depicts a first storage traffic stream j and a second storage traffic stream m. In various embodiments, each of the storage traffic streams may travel through the MPLS network 420 according to a LSP. In the depicted embodiment, the first storage traffic stream j has been assigned a LSP of k and the second storage traffic stream m has been assigned a LSP of n.

Figure 5:
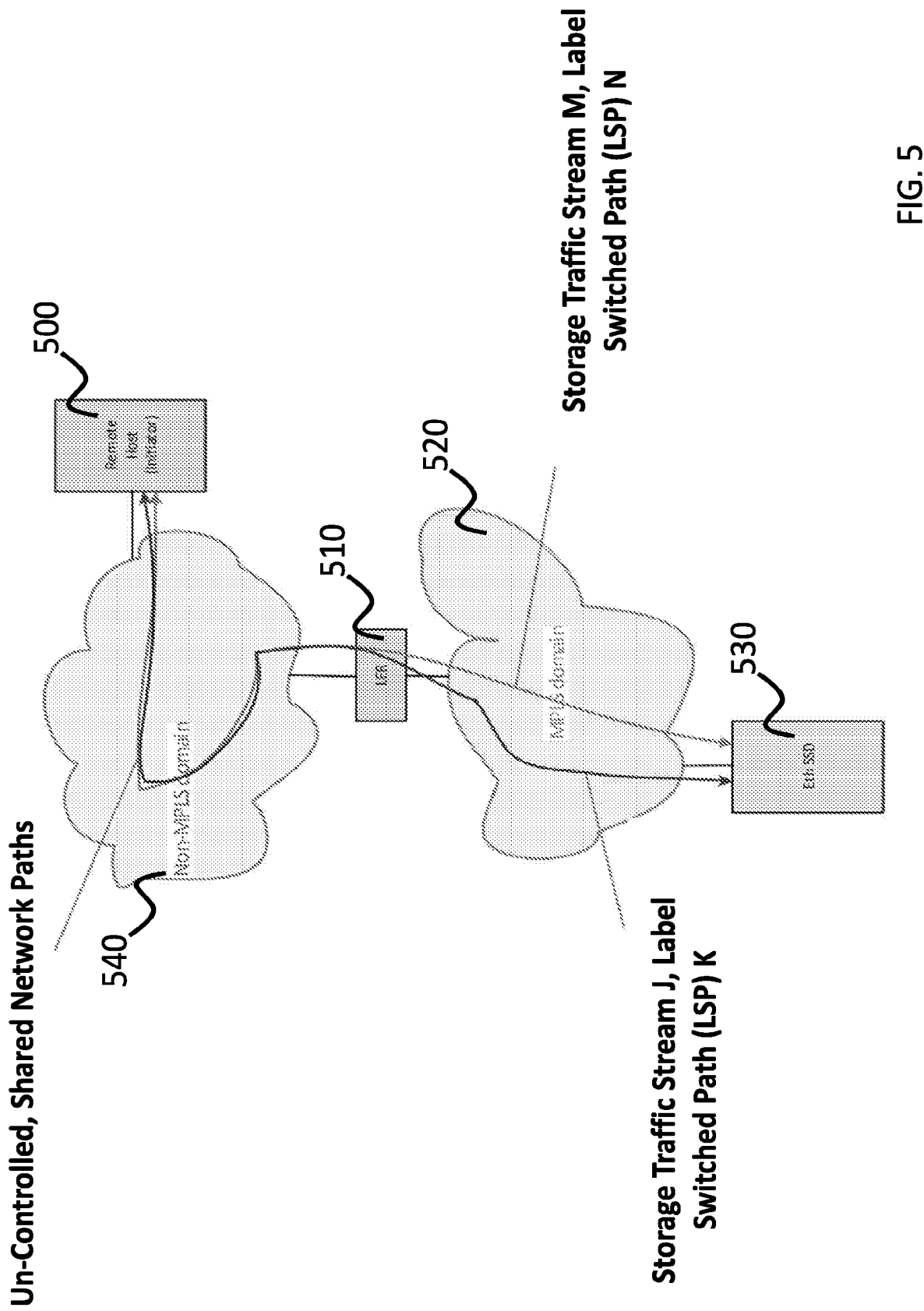
FIG. 5 depicts an example eSSD MPLS network where the initiating host is outside of the MPLS network domain according to various embodiments.

FIG. 5 depicts an example eSSD MPLS network where the initiating host is outside of the MPLS network domain according to various embodiments.

Referring to FIG. 5, in various embodiments, the remote host 500 may not be directly connected to a MPLS network 520. In these embodiments, the remote host 500 may send data over a conventional non-MPLS network 540 to the MPLS network 520 which is connected to the eSSD 530 using a conventional packet format. Each storage traffic data stream may travel on an un-controlled shared network path through the non-MPLS network 540 until the data reaches the MPLS network 520 at the LER 510. The LER 510 encapsulates the incoming data into a MPLS packet and strips the MPLS packet from outgoing data (e.g. traveling out to the non-MPLS network 540). For example, the storage traffic stream j may connect the remote host 500 to the eSSD 530 by the LSP k through the MPLS network 520 and through an un-controlled, shared network path through the non-MPLS network 540. Similarly, the storage traffic stream m, may connect the remote host 500 to the eSSD 530 by the LSP n through the MPLS network 520 and through an un-controlled, shared network path through the non-MPLS network 540. In this example, the storage traffic streams are able to be partially differentiated from each other and other network traffic.

Accordingly, the above described embodiments of the present disclosure provide a system and method for differentiated storage services in NVMe-oF Ethernet SSDs using MPLS. When utilizing a MPLS network, the system is capable of assigning LSPs according to various storage and other parameters. Each LSP may allow for a different level of services and provide a way to differentiate traffic through the network.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of providing storage services comprising:
receiving, at a solid state drive (SSD), an input/output (I/O) service request comprising a quality of service requirement for performing I/O between the SSD and a remote host, from the remote host;
matching, by the SSD, the I/O service request to a label switched path (LSP) based on the quality of service requirement in the I/O service request based on a label-lookup table (LLT) stored in the SSD; and
initiating, by the SSD, a storage traffic stream to connect the remote host to the SSD according to the LSP, wherein the SSD is configured to receive the I/O service request from the remote host using a first connection, and wherein the SSD is configured to initiate the storage traffic stream to connect the remote host to the SSD using the first connection.

2. The method of claim 1, wherein the SSD is an Ethernet SSD (eSSD).

3. The method of claim 2, wherein the I/O service request is received at the SSD via a first network and the storage traffic stream to connect the remote host to the SSD according to the LSP is initiated via the first network.

4. The method of claim 3, wherein the first network is a multiprotocol label switching (MPLS) network.

5. The method of claim 4, wherein the storage traffic stream comprises at least one MPLS packet.

6. The method of claim 5, further comprising:
encapsulating, by the eSSD, a first data packet into a MPLS packet, the MPLS packet further comprising a MPLS header having a label stack associated with the LSP, wherein the first data packet comprises one of a remote direct memory access (RDMA) packet, a RDMA over Converged Ethernet packet, an Internet Wide-area RDMA packet, or a non-volatile memory express (NVMe)-over-tape carrier package (TCP) packet.

7. The method of claim 1, wherein the I/O service request further comprises at least one storage parameter.

8. The method of claim 7, wherein the at least one storage parameter further comprises at least one of a Queue Pair ID (QPID), a Submission Queue ID (SQID), a Completion Queue ID (CQID), a non-volatile memory express (NVMe) Controller ID (CNTID), a Namespace ID (NSID), a logical block address (LBA) Range <Start LBA> to <End LBA>, a NVMe Stream ID, a Host Identifier, a NVMe Subsystem (NQN) Identifier, a Time-based ID, a Date-based ID, or a NVM Set ID.

9. The method of claim 1, wherein the I/O service request further comprises at least one network parameter.

10. A solid state drive (SSD) comprising:
a memory; and
a processor, wherein the processor is configured to execute instructions from the memory that, when executed by the processor, cause the processor to:
receive, an input/output (I/O) service request comprising a quality of service requirement for performing I/O between the SSD and a remote host, from the remote host;
match, by the processor, the I/O service request to a label switched path (LSP) based on the quality of service requirement in the I/O service request based on a label-lookup table (LLT) stored in the SSD; and
initiating a storage traffic stream to connect the remote host to the SSD according to the LSP, wherein the SSD is configured to receive the I/O service request from the remote host using a first connection, and wherein the SSD is configured to initiate the storage traffic stream to connect the remote host to the SSD using the first connection.

11. The SSD of claim 10, wherein the SSD is an Ethernet SSD (eSSD) comprising an Ethernet connection, wherein the eSSD is configured to receive the I/O service request from the remote host using the Ethernet connection and the eSSD is configured to initiate the storage traffic stream to connect the remote host to the eSSD using the Ethernet connection.

12. The SSD of claim 11, wherein the eSSD is configured to receive the I/O service request from the remote host via a first network and the eSSD is configured to initiate the storage traffic stream to connect the remote host to the eSSD via the first network, wherein the first network is a multiprotocol label switching (MPLS) network, and wherein the storage traffic stream comprises at least one MPLS packet.

13. The SSD of claim 12, wherein the instructions further cause the processor to:

encapsulate a first data packet into a MPLS packet, the MPLS packet further comprising a MPLS header having a label stack associated with the LSP.

14. The SSD of claim 13, wherein the first data packet comprises one of a remote direct memory access (RDMA) packet, a RDMA over Converged Ethernet packet, an Internet Wide-area RDMA packet, or a non-volatile memory express (NVMe)-over-tape carrier package (TCP) packet.

15. The SSD of claim 11, wherein the I/O service request further comprises at least one storage parameter.

16. The SSD of claim 15, wherein the I/O service request further comprises at least one of a Queue Pair ID (QPID), a Submission Queue ID (SQID), a Completion Queue ID (CQID), a non-volatile memory express (NVMe) Controller ID (CNTID), a Namespace ID (NSID), a logical block address (LBA) Range <Start LBA> to <End LBA>, a NVMe Stream ID, a Host Identifier, a NVMe Subsystem (NQN) Identifier, a Time-based ID, a Date-based ID, or a NVM Set ID.

17. The SSD of claim 11, wherein the I/O service request further comprises at least one network parameter.

18. A method of providing storage services comprising:
receiving, at a solid state drive (SSD), an input/output (I/O) service request comprising a quality of service requirement for performing I/O between the SSD and a remote host, from the remote host;
matching, by the SSD, the I/O service request comprising the quality of service requirement for performing I/O between the SSD and the remote host to a label switched path (LSP) based on a label-lookup table (LLT) stored in the SSD; and
encapsulating, by the SSD, a first data packet into a multiprotocol label switching (MPLS) packet comprising a MPLS header having a label stack associated with the LSP, wherein the SSD is configured to receive the I/O service request from the remote host using a first connection, and wherein the SSD is configured to initiate a storage traffic stream to connect the remote host to the SSD using the first connection.

19. The method of claim 18, further comprising initiating, by the SSD, the storage traffic stream that sends the MPLS packet to the remote host from the SSD according to the LSP through a first network, wherein:
the SSD is an Ethernet SSD (eSSD),
the I/O service request is received at the eSSD via the first network and the storage traffic stream to connect the remote host to the eSSD according to the LSP is initiated via the first network,
I/O service request further comprises at least one of a Queue Pair ID (QPID), a Submission Queue ID (SQID), a Completion Queue ID (CQID), a non-volatile memory express (NVMe) Controller ID (CNTID), a Namespace ID (NSID), a logical block address (LBA) Range <Start LBA> to <End LBA>, a NVMe Stream ID, a Host Identifier, a NVMe Subsystem (NQN) Identifier, a Time-based ID, a Date-based ID, or a NVM Set ID, and
the first network is a MPLS network.

20. The method of claim 19, wherein the first data packet comprises one of a remote direct memory access packet (RDMA), a RDMA over Converged Ethernet packet, an Internet Wide-area RDMA packet, or a non-volatile memory express (NVMe)-over-tape carrier package (TCP) packet.

* * * * *